US012800772B2

(12) United States Patent
Li et al.

(10) Patent No.: US 12,800,772 B2
(45) Date of Patent: Nov. 17, 2026

(54) METHOD AND APPARATUS FOR DETECTING AND POSITIONING INSPECTION TARGET, DEVICE, AND STORAGE MEDIUM

(71) Applicant: AUTEL ROBOTICS CO., LTD., Shenzhen (CN)

(72) Inventors: Yaxue Li, Shenzhen (CN); Jia Xu, Shenzhen (CN); Kangli Wang, Shenzhen (CN)

(73) Assignee: AUTEL ROBOTICS CO., LTD., Shenzhen (CN)

(*) Notice: Subject to any disclaimer, the term of this patent is extended or adjusted under 35 U.S.C. 154(b) by 12 days.

(21) Appl. No.: 18/760,269

(22) Filed: Jul. 1, 2024

(65) Prior Publication Data

US 2025/0004141 A1 Jan. 2, 2025

(30) Foreign Application Priority Data

Jun. 30, 2023 (CN) ........................ 202310795384.X

(51) Int. Cl.
*G06F 16/29* (2019.01)
*G01S 19/14* (2010.01)
*G06T 7/73* (2017.01)

(52) U.S. Cl.
CPC .............. *G01S 19/14* (2013.01); *G06F 16/29* (2019.01); *G06T 7/73* (2017.01); *G06T 2207/10032* (2013.01)

(58) Field of Classification Search
CPC . G01S 19/14; G06T 7/73; G06T 2207/10032; G06F 16/29

(Continued)

(56) References Cited

U.S. PATENT DOCUMENTS

| | | | | |
|---|---|---|---|---|
| 6,687,571 B1 * | 2/2004 | Byrne | .................. | G05D 1/0289 700/39 |
| 9,738,381 B1 * | 8/2017 | Loud | .................... | G05D 1/0094 |

(Continued)

FOREIGN PATENT DOCUMENTS

| | | |
|---|---|---|
| CN | 110866990 A | 3/2020 |
| CN | 112697162 A | 4/2021 |

(Continued)

OTHER PUBLICATIONS

The first office action of the CN priority application issued on Jul. 31, 2025.

(Continued)

*Primary Examiner* — Manglesh M Patel
(74) *Attorney, Agent, or Firm* — Frank Gao, Esq.

(57) ABSTRACT

A method and an apparatus are provided for detecting and positioning an inspection target, a device, and a storage medium. The method includes: obtaining a target inspection sub-region of a target inspection device in a target inspection process, and detecting a first inspection target in the target inspection sub-region and a first geographical position of the first inspection target; deleting a second inspection target and a geographical position of the second inspection target in an inspection target set; adding the first inspection target and the first geographical position to the inspection target set; and displaying all inspection targets in the inspection target set at geographical positions corresponding to all the inspection targets in an inspection map.

15 Claims, 4 Drawing Sheets

(58) Field of Classification Search
USPC ....................................................... 701/468, 2
See application file for complete search history.

(56) References Cited

U.S. PATENT DOCUMENTS

| | | | | |
|---|---|---|---|---|
| 10,081,443 | B2 * | 9/2018 | Engel | G01M 5/0016 |
| 10,682,677 | B2 * | 6/2020 | Sen | B08B 13/00 |
| 10,866,927 | B2 * | 12/2020 | Gupta | G01M 5/0091 |
| 11,334,953 | B1 * | 5/2022 | Tofte | G06V 10/42 |
| 11,794,890 | B2 * | 10/2023 | Bauer | G08G 5/26 |
| 11,807,407 | B2 * | 11/2023 | Asfoor | B64U 60/20 |
| 11,829,959 | B1 * | 11/2023 | Latif | G05D 1/104 |
| 11,947,362 | B1 * | 4/2024 | Alnajjar | F16L 55/1645 |
| 2012/0215348 | A1 * | 8/2012 | Skrinde | B25J 9/163 701/2 |
| 2016/0378109 | A1 * | 12/2016 | Raffa | G05D 1/0038 701/2 |
| 2018/0089611 | A1 * | 3/2018 | Burch, V | B64U 50/19 |
| 2018/0170540 | A1 * | 6/2018 | Claybrough | B64F 5/60 |
| 2018/0188045 | A1 * | 7/2018 | Wheeler | B60W 30/0956 |
| 2019/0049962 | A1 * | 2/2019 | Ouellette | G05D 1/0094 |
| 2020/0005422 | A1 * | 1/2020 | Subramanian | G06N 3/0464 |
| 2020/0174478 | A1 * | 6/2020 | Abdellatif | G06T 7/50 |
| 2020/0180791 | A1 * | 6/2020 | Kimberly | B64D 45/00 |
| 2020/0184194 | A1 * | 6/2020 | Edara | G06N 3/02 |
| 2020/0386882 | A1 * | 12/2020 | Klein | G06Q 10/103 |
| 2021/0173414 | A1 * | 6/2021 | Starr | G08G 5/56 |
| 2021/0206519 | A1 * | 7/2021 | Shockley | B64G 1/242 |
| 2022/0250245 | A1 * | 8/2022 | Panigrahi | G01M 17/007 |
| 2022/0274703 | A1 * | 9/2022 | Di Cosola | G07C 3/14 |
| 2022/0405906 | A1 * | 12/2022 | Swanson | G06V 10/16 |
| 2023/0073587 | A1 * | 3/2023 | Scott | G06T 7/001 |
| 2024/0265698 | A1 * | 8/2024 | Clontz | G06F 16/23 |
| 2024/0404203 | A1 * | 12/2024 | Rosca | G01C 21/20 |
| 2024/0419192 | A1 * | 12/2024 | Kuc | G05D 1/221 |

FOREIGN PATENT DOCUMENTS

| | | | |
|---|---|---|---|
| CN | 113286129 | A | 8/2021 |
| CN | 113916244 | A | 1/2022 |
| CN | 115810156 | A | 3/2023 |
| CN | 116299619 | A | 6/2023 |
| WO | WO2021102796 | A1 | 6/2021 |

OTHER PUBLICATIONS

EN translation of the first office action of the CN priority application-by machine.

* cited by examiner

METHOD AND APPARATUS FOR DETECTING AND POSITIONING INSPECTION TARGET, DEVICE, AND STORAGE MEDIUM

CROSS REFERENCE TO RELATED DISCLOSURE

This application is filed based upon and claims priority to Chinese patent application 202310795384.X, filed on Jun. 30, 2023 and entitled "METHOD, APPARATUS AND DEVICE FOR DETECTING AND POSITIONING INSPECTION TARGET AND STORAGE MEDIUM" the entire disclosure of which is incorporated herein by reference for all purposes.

BACKGROUND

With the development of science and technology, in more and more industries, drone inspection is chosen to replace traditional manual inspection. A drone may be equipped with a variety of tools, such as cameras and infrared sensors. After a flight mission is set for a drone, in a process of performing the flight mission, the drone may transmit images and videos collected by the drone to a background system in real time, and a background staff may monitor an inspection screen in real time to determine a target in the screen, thereby realizing remote inspection.

A cluster inspection scheme refers to that a plurality of drones fly in an inspection region and transmit images and videos to the background system, to complete an inspection task. Because regions covered by a plurality of drones overlap, a target may be counted repeatedly in different positions and/or at different moments, resulting in statistical bias.

SUMMARY

The present disclosure relates to the field of target detection, and in particular, to a method and an apparatus for detecting and positioning an inspection target, a device, and a storage medium.

The present disclosure provides a method and an apparatus for detecting and positioning an inspection target, a device, and a storage medium, to solve the technical problem of statistical bias caused by repeated target statistics.

According to a first aspect, a method for detecting and positioning an inspection target is provided, including:

obtaining a target inspection sub-region of a target inspection device in a target inspection process, and detecting a first inspection target in the target inspection sub-region and a first geographical position of the first inspection target, where the target inspection process is a process in which a plurality of inspection devices perform inspection tasks in inspection regions, the target inspection device is any inspection device in the plurality of inspection devices, the target inspection sub-region is a sub-region inspected by the target inspection device, and the target inspection sub-region is one of the inspection regions;

deleting a second inspection target and a geographical position of the second inspection target in an inspection target set, where the inspection target set includes all inspection targets detected by the plurality of inspection devices in the target inspection process and geographical positions of all the inspection targets, and the second inspection target is an inspection target that is in the inspection target set and that is located in the target inspection sub-region;

adding the first inspection target and the first geographical position to the inspection target set; and displaying all inspection targets in the inspection target set at geographical positions corresponding to all the inspection targets in an inspection map.

According to a second aspect, an apparatus for detecting and positioning an inspection target is provided, including:

a target detecting module, configured to: obtain a target inspection sub-region of a target inspection device in a target inspection process, and detect a first inspection target in the target inspection sub-region and a first geographical position of the first inspection target, where the target inspection process is a process in which a plurality of inspection devices perform inspection tasks in inspection regions, the target inspection device is any inspection device in the plurality of inspection devices, the target inspection sub-region is a sub-region inspected by the target inspection device, and the target inspection sub-region is one of the inspection regions;

a target deleting module, configured to delete a second inspection target and a geographical position of the second inspection target in an inspection target set, where the inspection target set includes all inspection targets detected by the plurality of inspection devices in the target inspection process and geographical positions of all the inspection targets, and the second inspection target is an inspection target that is in the inspection target set and that is located in the target inspection sub-region;

a target saving module, configured to add the first inspection target and the first geographical position to the inspection target set; and a target displaying module, configured to display all inspection targets in the inspection target set at geographical positions corresponding to all the inspection targets in an inspection map.

According to a third aspect, a computer device is provided, including a memory and one or more processors, where the memory is connected to the one or more processors, the one or more processors are configured to execute one or more computer programs stored in the memory, and when executing the one or more computer programs, the one or more processors enable the computer device to implement the method for detecting and positioning an inspection target according to the first aspect.

According to a fourth aspect, a computer-readable storage medium is provided, where the computer-readable storage medium stores a computer program, the computer program includes a program instruction, and the program instruction, when being executed by a processor, enables the processor to implement the method for detecting and positioning an inspection target according to the first aspect.

The present disclosure may achieve the following technical effects: enabling the inspection target located in the target inspection sub-region and the geographical position of the inspection target located in the target inspection sub-region that are in the inspection target set to be unique, and avoiding repeated statistics of an inspection target in the inspection target set due to an overlapping region covered by the plurality of inspection devices, thereby contributing to improving accuracy of inspection target statistics.

DETAILED DESCRIPTION

The following describes the technical solutions in embodiments of the present disclosure with reference to the accompanying drawings in embodiments of the present disclosure.

The technical solution of the present disclosure is suitable for a cluster inspection scenario, where the cluster inspection scenario may refer to a scenario in which a plurality of drones fly in a same region for an inspection task or a scenario in which another inspection device is used for an inspection task, such as a scenario in which a plurality of inspection robots walk on the ground to perform an inspection task on the ground.

Figure 1:
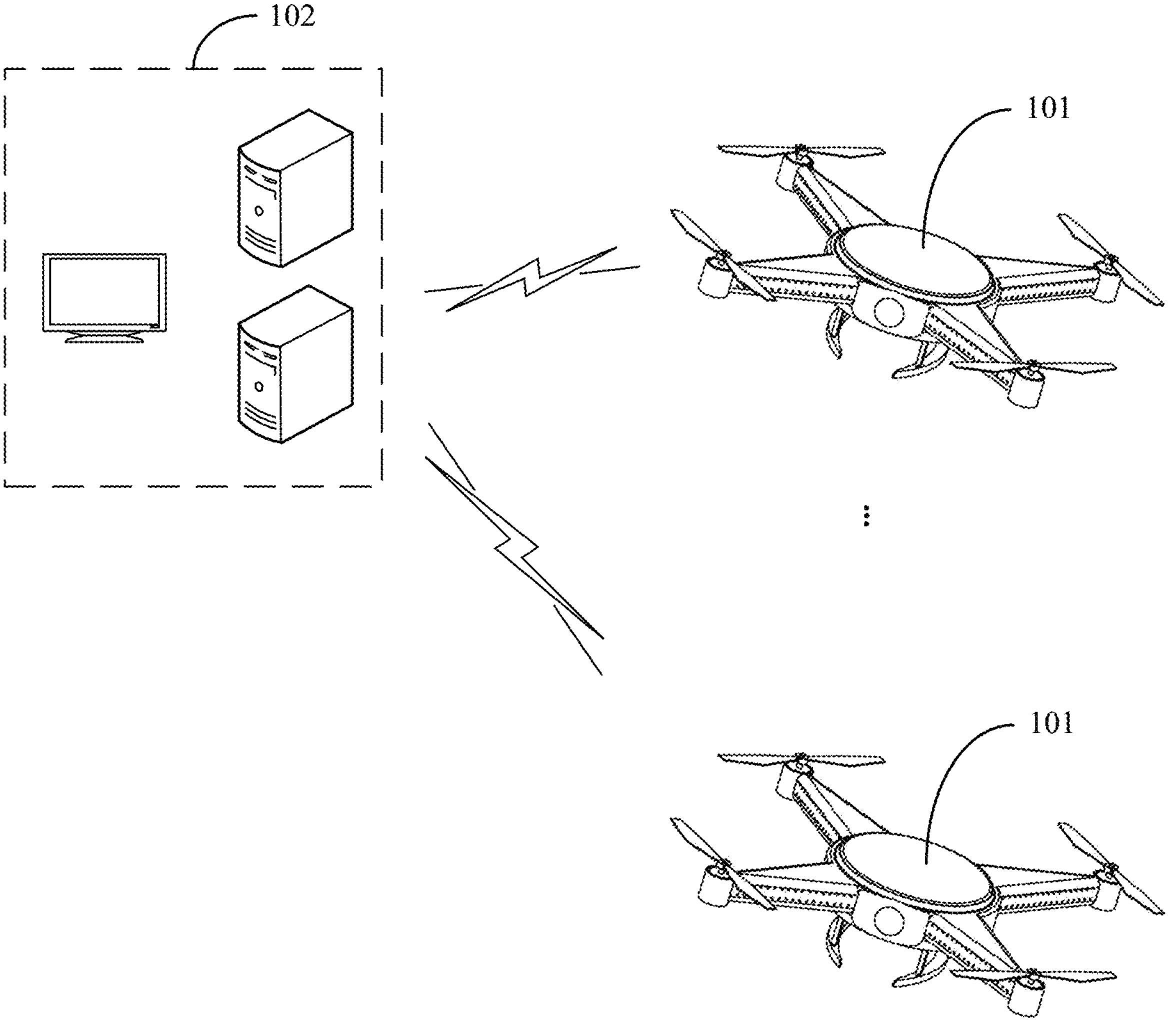
FIG. 1 is a schematic diagram of a cluster inspection system according to an embodiment of the present disclosure.

For ease of understanding, the following first describes a cluster inspection system involved in the present disclosure. Referring to FIG. 1, FIG. 1 is a schematic diagram of a cluster inspection system according to an embodiment of the present disclosure. As shown in FIG. 1, the cluster inspection system 10 may include a plurality of inspection devices 101 and an inspection control platform 102. The plurality of inspection devices 101 are used to replace people in traveling in a region that needs to be inspected (that is, an inspection region), collecting relevant data (image data and various sensor data) in the inspection region in real time, and transmitting the collected relevant data to the inspection control platform 102 to complete an inspection task. The inspection control platform 102 is a user-oriented device, and the inspection control platform 102 is used to issue inspection instructions to the plurality of inspection devices 101, to instruct the inspection devices 101 to perform inspection tasks based on the inspection instructions, where a region covered by the plurality of inspection devices 101 in performing the inspection tasks is the inspection region. The inspection control platform 102 may send inspection instructions to the plurality of inspection devices 101 in response to a user instruction, so that the plurality of inspection devices 101 may perform inspection tasks under the control of a user. The inspection device 101 may be a drone, an inspection robot, or the like. The inspection control platform 102 may include a cloud platform, a background server, a manual interaction device (such as a display screen), and the like.

Figure 2:
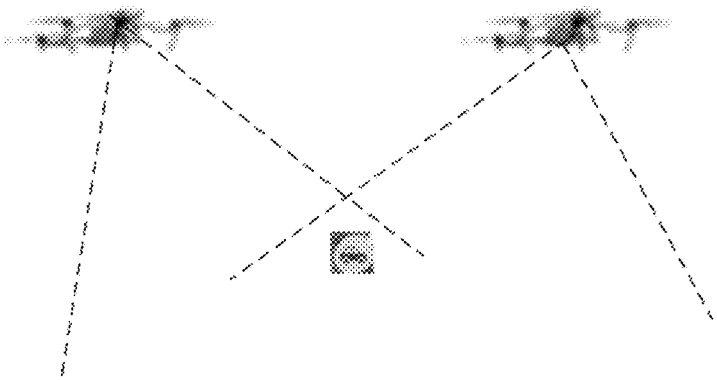
FIG. 2 is a schematic diagram of repeated detection of an inspection target according to an embodiment of the present disclosure.

To ensure that the plurality of inspection devices 101 can completely cover the inspection region, as shown in FIG. 2, regions covered by the plurality of inspection devices 101 may partially overlap during inspection tasks. In this case, when the plurality of inspection devices 101 perform inspection tasks, different inspection devices may inspect a same target at different moments or at a same moment, resulting in repeated target statistics and statistical bias. The technical solution of the present disclosure aims to solve the technical problem.

The technical solution of the present disclosure may be used in the inspection control platform in the cluster inspection system shown in FIG. 1. The technical solution of the present disclosure is described in detail below.

Figure 3:
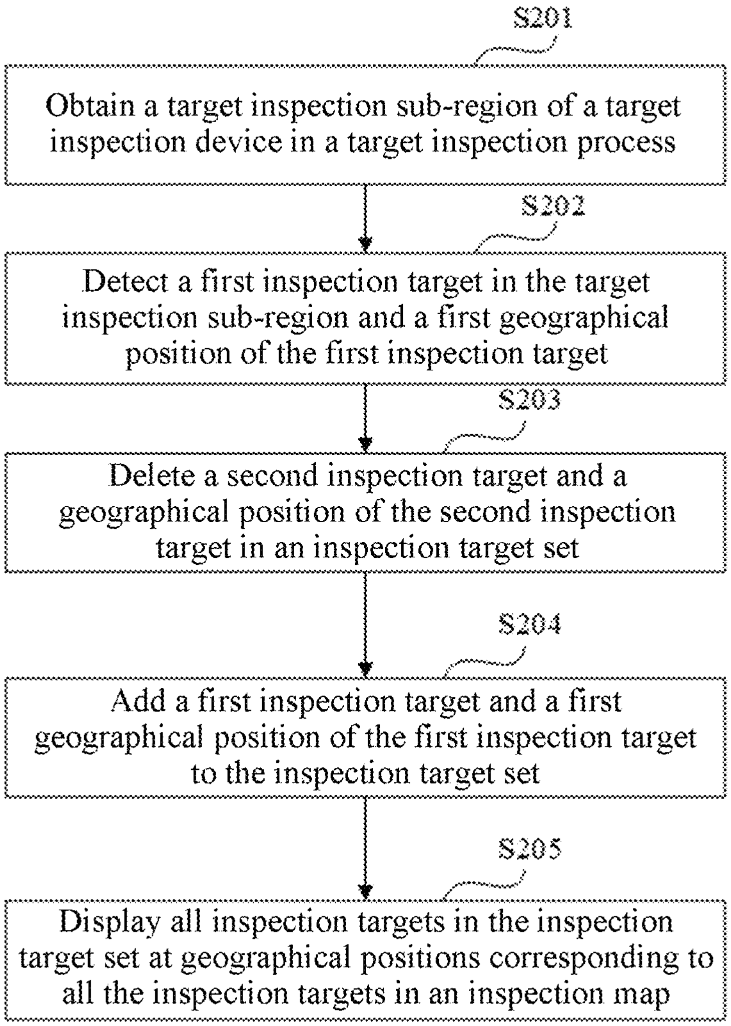
FIG. 3 is a schematic flowchart of a method for detecting and positioning an inspection target according to an embodiment of the present disclosure.

Referring to FIG. 3, FIG. 3 is a schematic flowchart of a method for detecting and positioning an inspection target according to an embodiment of the present disclosure. As shown in FIG. 3, the method includes the following steps.

S201: Obtain a target inspection sub-region of a target inspection device in a target inspection process.

The target inspection process is a process in which a plurality of inspection devices perform inspection tasks in an inspection region, the plurality of inspection devices may form a cluster inspection system, and the cluster inspection system may be as shown in FIG. 1. The target inspection device is any inspection device in the plurality of inspection devices. The target inspection process may be specifically a road inspection process, a power inspection process, a safety inspection process, or the like, and is not limited to the examples herein.

The target inspection sub-region is a sub-region inspected by the target inspection device in the target inspection process. The target inspection sub-region may be understood as a maximum range of region that a sensor on the target inspection device can detect when the target inspection device performs a task, and the target inspection sub-region is one of the inspection regions of the plurality of inspection devices. The inspection regions of the plurality of inspection devices are related to the inspection tasks performed by the plurality of inspection devices. If the inspection tasks performed by the plurality of inspection devices are different, the inspection regions of the plurality of inspection devices are different. For example, if the inspection tasks performed by the plurality of inspection devices are to inspect an entire campus region, the inspection regions of the plurality of inspection devices are the entire campus region, and the target inspection sub-region may be a classroom region, a playground region, an office region, and the like. Both the target inspection sub-region and the inspection regions of the plurality of inspection devices may be marked on an inspection map, the inspection map is a map used by the plurality of inspection devices in a process of performing inspection tasks, and positions of the inspection devices may be displayed in the inspection map.

In some possible cases, the target inspection sub-region of the target inspection device may be obtained based on image recognition. A target inspection image may be obtained, where the target inspection image is an inspection image of the target inspection device; and an inspection map region corresponding to the target inspection image is determined as the target inspection sub-region. The target inspection image may be understood as an inspection image obtained by the target inspection device when performing an inspection task. The target inspection image may be shot by a camera in the target inspection device.

Figure 4:
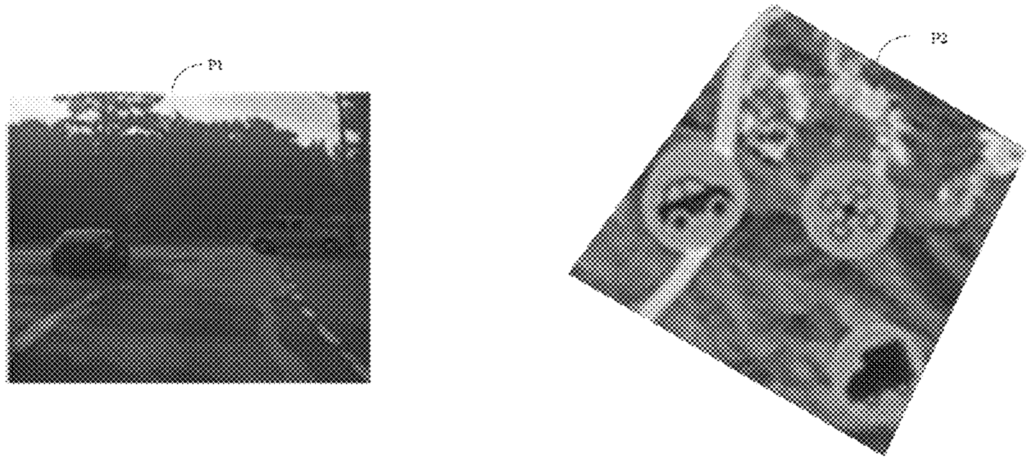
FIG. 4 is a schematic diagram of a target inspection image and an inspection map region corresponding to the target inspection image according to an embodiment of the present disclosure.

The inspection map region corresponding to the target inspection image is a region formed by mapping image vertices of the target inspection image into the inspection map. For example, referring to FIG. 4, it is assumed that the target inspection image is shown as P1 in FIG. 4, the region formed by mapping image vertices of the target inspection image into the inspection map is shown as P2 in FIG. 4, and image content in P2 is the inspection map.

In a feasible implementation, the inspection map region corresponding to the target inspection image may be determined by the following steps A1 to A3.

A1: Obtain vertex image coordinates of the target inspection image.

The vertex image coordinates may be coordinates in a pixel coordinate system or in an image coordinate system. The coordinates in the image coordinate system may be converted from those in the pixel coordinate system, and coordinates in the image coordinate system and coordinates in the pixel coordinate system meet the following conversion relationship: $x=(u-uo)*W$, $y=(v-vo)*H$, where (x, y) represents coordinates in the image coordinate system, (u, v) represents coordinates in the pixel coordinate system, W and H are a width and a height of the target inspection image respectively, and (uo, vo) are pixel coordinates of a center of the target inspection image. When the vertex image coordinates are coordinates in the pixel coordinate system, the vertex image coordinates of the target inspection image include (0, 0), (0, H), (W, 0), (W, H), respectively representing coordinates of an upper left corner, a lower left corner, an upper right corner, and a lower right corner of the target inspection image in the pixel coordinate system.

A2: Convert the vertex image coordinates of the target inspection image to obtain inspection position coordinates corresponding to the target inspection image.

The inspection position coordinates are coordinates in a world coordinate system, the coordinates in the world coordinate system may be global positioning system (global positioning system, GPS) coordinates, and the coordinates in the world coordinate system may be represented as (X, Y, Z). The inspection position coordinates corresponding to the target inspection image include (X1, Y1, Z1), (X2, Y2, Z2), (X3, Y3, Z3), and (X4, Y4, Z4), respectively representing coordinates of an upper left corner, a lower left corner, an upper right corner, and a lower right corner of the target inspection image in the world coordinate system.

The vertex image coordinates of the target inspection image may be converted through steps A21 to A23.

A21: Obtain a first device attitude and first device position coordinates of a target inspection device.

The first device attitude of the target inspection device is a device attitude of the target inspection device when obtaining the target inspection image. The first device attitude may be represented by an euler angle, and the first device attitude may be represented as (γ, θ, φ), where γ is a course angle and refers to an angle of rotation relative to a z axis of the world coordinate system, θ is a roll angle and refers to an angle of rotation relative to an x axis of the world coordinate system, and φ is a pitch angle and refers to an angle of rotation relative to a y axis of the world coordinate system.

The first device position coordinates of the target inspection device are position coordinates of the target inspection device when obtaining the target inspection image, and the first device position coordinates are coordinates in the world coordinate system. The first device position coordinates may be represented as (X0, Y0, Z0), and X0, Y0, Z0 may represent translation parameters relative to an origin of the world coordinate system that are generated when the inspection device obtains the target inspection image. In a world coordinate system with a WGS-84 coordinate system as a GPS coordinate system, the origin of the world coordinate system may be the center of mass of the earth.

In the target inspection process, the plurality of inspection devices separately report, to the inspection control platform, an inspection image, and a device attitude and a device position obtained when shooting the inspection image. The inspection control platform may obtain the target inspection image, the first device attitude, and the first device position coordinates of the target inspection device based on inspection images, device attitudes, and device positions reported by the plurality of inspection devices.

A22: Determine a target conversion matrix based on the first device attitude and the first device position coordinates of the target inspection device.

The target conversion matrix indicates a conversion relationship between a pixel coordinate system of the target inspection device when obtaining the target inspection image and the world coordinate system. The target conversion matrix may include a first projection conversion matrix and a second projection conversion matrix. The first projection conversion matrix represents a conversion relationship between a camera coordinate system and a device coordinate system, and the second projection conversion matrix represents a conversion relationship between a device coordinate system and a world coordinate system. The first projection conversion matrix may be represented as R1. Because the camera is fixed on the inspection device, a relative position relationship between the camera and the inspection device is fixed, and the first conversion matrix may be obtained through pre-calibration. The second conversion matrix includes a rotation matrix R2 and a translation vector T. The rotation matrix R2 may be obtained based on the first device attitude of the inspection device when obtaining the target inspection image, and the translation vector T is obtained based on the first device position coordinates.

A23: Convert the vertex image coordinates of the target inspection image based on the target conversion matrix, to obtain inspection position coordinates corresponding to the target inspection image.

According to the following conversion formulas (1) to (3), the vertex image coordinates of the target inspection image may be converted to obtain the inspection position coordinates corresponding to the target inspection image:

$$P2 = ZK - 1P1 \quad (1)$$

$$P3 = R1P2 \quad (2)$$

$$P4 = R2P3 + T, \quad (3)$$

where

K is a camera intrinsic parameter matrix of the camera in the inspection device, and P1 represents coordinates in the pixel coordinate system, where P1 herein may be (0, 0, 1), (0, H, 1), (W, 0, 1), or (W, H, 1), P2 represents coordinates in the camera coordinate system, P3 represents coordinates in the device coordinate system of the inspection device, and P4 represents coordinates in the world coordinate system.

A3: In the inspection map, determine a sub-region enclosed by the inspection position coordinates corresponding to the target inspection image as the inspection map region corresponding to the target inspection image.

Map points corresponding to four inspection position coordinates may be determined in the inspection map, to obtain four map points, and the four map points are connected in the inspection map to obtain the inspection map region corresponding to the target inspection image.

The inspection sub-region of the inspection device is determined by obtaining images and coordinate conversion, so that the inspection sub-region of the inspection device may be accurately determined.

Optionally, the target inspection sub-region of the inspection device may be obtained based on laser radar scanning, infrared scanning, and the like, and this is not limited in the present disclosure.

S202: Detect a first inspection target in the target inspection sub-region and a first geographical position of the first inspection target.

An inspection target refers to a target that a plurality of inspection devices need to obtain/detect when performing inspection tasks. If inspection tasks performed by the plurality of inspection devices are different, inspection targets are different. For example, if the inspection tasks performed by the plurality of inspection devices are road inspection tasks, the inspection targets may be pedestrians, vehicles, traffic lights, and other signs on the road. For another example, if the inspection tasks performed by the plurality of inspection devices are power inspection processes, the inspection targets may be telephone poles. This is not limited in the present disclosure.

The first inspection target refers to an inspection target located in the target inspection sub-region when the target inspection device performs a task. The first geographical position of the first inspection target refers to a geographical position of the first inspection target on the inspection map, and the first geographical position is represented by coordinates in the world coordinate system.

In a feasible implementation, a first inspection target in the target inspection sub-region and a first geographical position of the first inspection target in the target inspection sub-region are detected based on image recognition and target location.

Specifically, the first inspection target and the first geographical position of the first inspection target may be detected through the following steps B1 and B2.

B1: Perform inspection target identification on the target inspection image to obtain the first inspection target and the first image coordinates of the first inspection target in the target inspection image.

In a feasible implementation, inspection target identification may be performed on the target inspection image through a target identification model to obtain the first inspection target and the first image coordinates of the first inspection target in the target inspection image.

The target identification model may be a model trained based on deep learning technology for identifying an inspection target, and the target identification model includes but is not limited to a region convolutional neural network (region convolutional neural networks, RCNN) model, a YOLO (you only look once) model, an SSD (single shot multibox detector) model, and the like. This is not limited in the present disclosure.

After the target inspection image is input into the target identification model, the target identification model may output information {ut, vt, w, h, c} of an inspection target of the target inspection image in the target inspection image, where the inspection target in the target inspection image is the first inspection target, (ut, vt) are pixel coordinates of a center point of the first inspection target in the target inspection image, w and h are respectively a width and a height of the first inspection target in the target inspection image, and c is a category of the first inspection target. For example, if inspection tasks performed by the plurality of inspection devices are road inspection tasks, the category of the first inspection target may be one of pedestrians, vehicles, traffic lights, and other signs on the road.

It should be understood that (ut, vt) may also be converted into coordinates (xt, yt) in the image coordinate system, and the first image coordinates of the first inspection target in a current target inspection image may be (ut, vt) or (xt, yt).

B2: Convert first image coordinates of the first inspection target in the target inspection image to obtain first geographical position coordinates of the first inspection target.

The first geographical position coordinates are coordinates in the world coordinate system, and the first geographical position coordinates are (Xt, Yt, Zt).

The first image coordinates of the first inspection target in the current target inspection image may be converted through steps B21 to B23.

B21: Obtain a first device attitude and first device position coordinates of an inspection device.

B22: Determine a target conversion matrix based on the first device attitude and the first device position coordinates of the inspection device.

For a specific implementation of steps B21 and B22, refer to related descriptions of steps A21 and A22. Details are not described herein again.

B23: Convert first image coordinates of the first inspection target in the target inspection image based on the target conversion matrix, to obtain the first geographical position coordinates.

According to conversion formulas (1) to (3) in step A23, the first image coordinates of the first inspection target in the target inspection image may be converted to obtain the first geographical position coordinates. P1 herein represents the first image coordinates of the first inspection target in the target inspection image, and the first image coordinates are (ut, vt, 1).

S203: Delete a second inspection target and a geographical position of the second inspection target in an inspection target set.

The inspection target set herein includes all inspection targets and geographical positions of all the inspection targets detected by the plurality of inspection devices in the target inspection process, and the geographical positions of all the inspection targets in the inspection target set are represented by coordinates in the world coordinate system. The inspection target set may include not only the inspection target and the geographical position of the inspection target, but also a category of the inspection target. The inspection target set may include a plurality of inspection target subsets, and different inspection target subsets may include different categories of inspection targets.

The second inspection target is an inspection target that is located in the target inspection sub-region and that is in the inspection target set. Deleting the second inspection target and the geographical position of the second inspection target in the inspection target set aims to ensure uniqueness of the inspection target in the inspection target set.

Optionally, before deleting the second inspection target and the geographical position of the second inspection target in the inspection target set, it may be determined first whether the second inspection target exists in the inspection target set. If the second inspection target exists in the inspection target set, it indicates that another inspection device has inspected the inspection target in the target inspection sub-region, and the first inspection target may already exist in the inspection target set, so direct addition may lead to repetition of the inspection target in the inspection target set, and step S204 needs to be performed; and if the second inspection target does not exist in the inspection target set, it indicates that another inspection device has not detected the inspection target in the target inspection sub-region, so step S203 may be skipped, and step S204 may be directly performed.

In a feasible implementation, it may be determined whether the second inspection target exists in the inspection target set through the following steps C1 to C3.

C1: Determine whether a second geographical position located in the target inspection sub-region exists in the inspection target set.

Specifically, each geographical position in the inspection target set may be compared with a geographical position included in the target inspection sub-region, to determine whether all geographical positions in the inspection target set are within the target inspection sub-region. If any geographical position in the inspection target set is within the target inspection sub-region, it indicates that there is a second geographical position that is in the target inspection sub-region in the inspection target set. If all the geographical positions in the inspection target set are not in the target inspection sub-region, it indicates that there is no second geographical position that is in the target inspection sub-region in the inspection target set, and step S204 may be directly performed.

C2: If the second geographical position exists in the inspection target set, determine that the second inspection target exists in the inspection target set.

In a case that there is a second inspection target in the inspection target set, it may also be determined whether a geographical position of the second inspection target is the same as the first geographical position; if the geographical position of the second inspection target is the same as the first geographical position, it indicates that an inspection target and a geographical position of the inspection target in the target inspection sub-region have not changed, step S203 and step S204 may be skipped, and step S205 may be directly performed; and if the geographical position of the second inspection target is different from the first geographical position, it indicates that the inspection target and/or the geographical position of the inspection target in the target inspection sub-region have changed, and step S203 is performed.

C3: If the second geographical position does not exist in the inspection target set, determine that the second inspection target does not exist in the inspection target set.

It is simple to detect whether there is an inspection target in the inspection target set by detecting whether there is a target position that is in a target inspection sub-region in the inspection target set.

Optionally, it may be determined whether the second inspection target exists in the inspection target set in another implementation.

S204: Add a first inspection target and a first geographical position of the first inspection target to the inspection target set.

S205: Display all inspection targets in the inspection target set at geographical positions corresponding to all the inspection targets in an inspection map.

Figure 5:
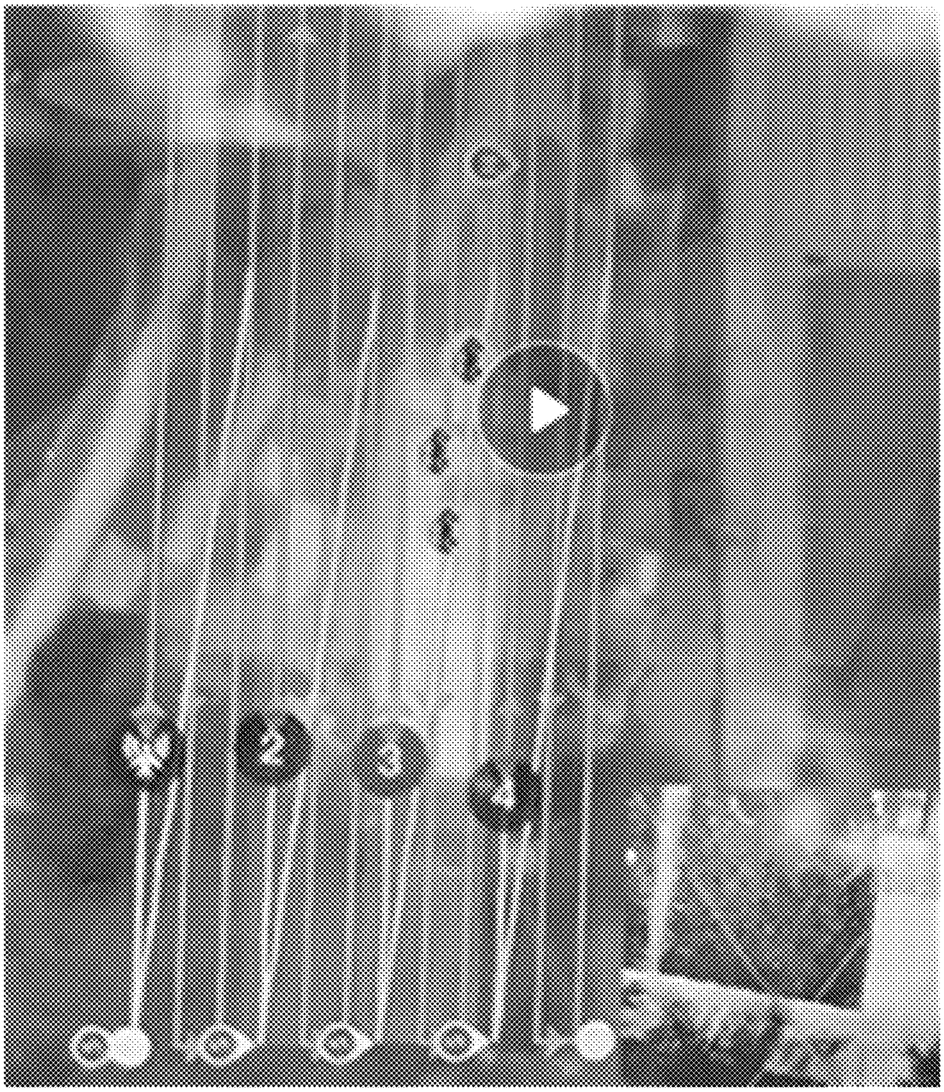
FIG. 5 is a schematic diagram of displaying, on an inspection map, an inspection target and an inspection target position in an inspection target set according to an embodiment of the present disclosure.

Displaying all inspection targets in the inspection target set at geographical positions corresponding to all the inspection targets in an inspection map may be as shown in FIG. 5, and in FIG. 5, four inspection devices perform inspection tasks in a same inspection region.

In a technical solution corresponding to FIG. 3, in a process that the plurality of inspection devices perform tasks in the inspection regions, after the target inspection sub-region of the inspection device is obtained, and the inspection target located in the target inspection sub-region and the geographical position of the inspection target are detected, the detected inspection target and the geographical position of the inspection target are added to the inspection target set after the inspection target located in the target inspection sub-region and the geographical position of the inspection target located in the target inspection sub-region that are in the inspection target set are deleted first. This can enable the inspection target located in the target inspection sub-region and the geographical position of the inspection target located in the target inspection sub-region that are in the inspection target set to be unique, and avoid repeated statistics of an inspection target in the inspection target set due to an overlapping region covered by the plurality of inspection devices, thereby contributing to improving accuracy of inspection target statistics.

Figure 6:
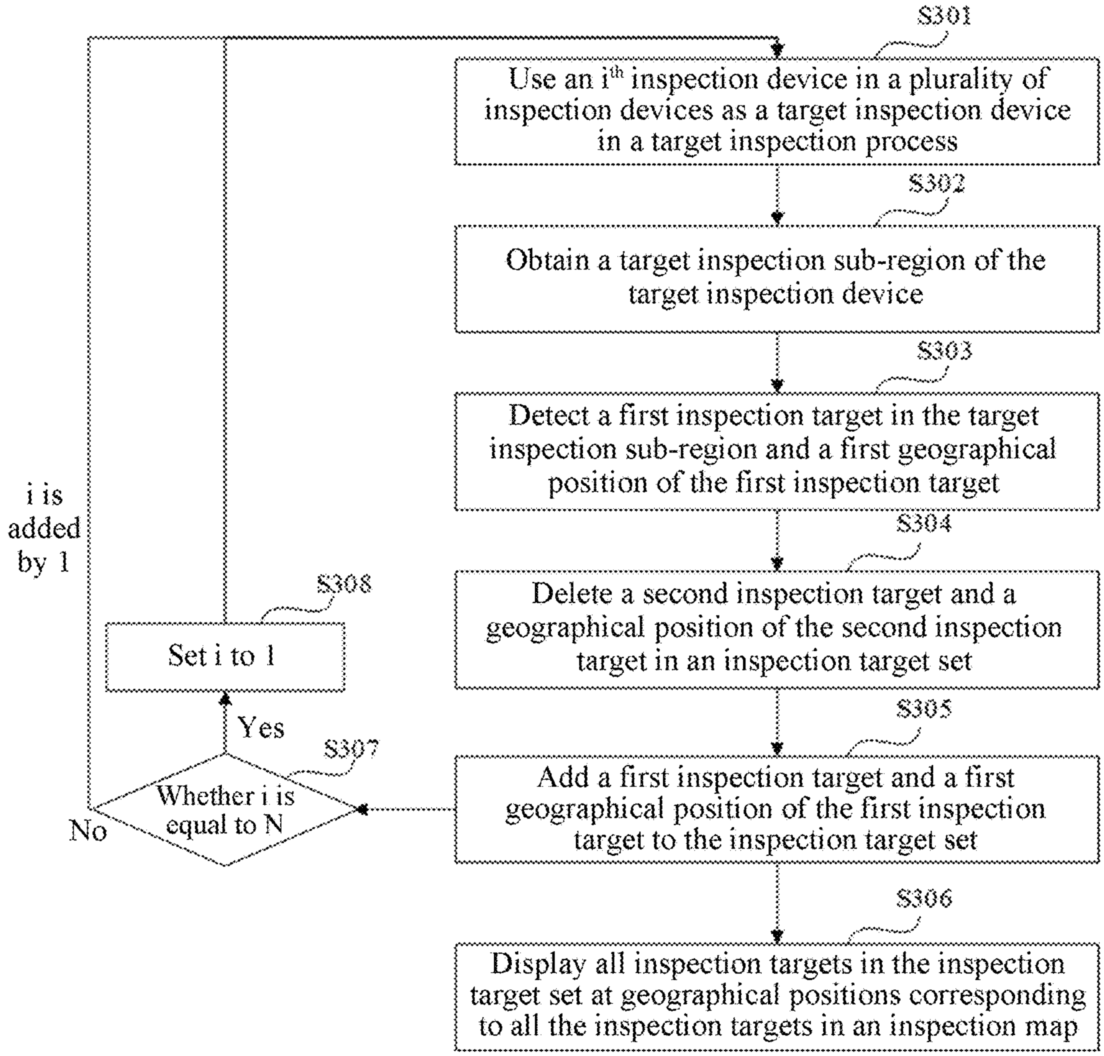
FIG. 6 is a schematic flowchart of another method for detecting and positioning an inspection target according to an embodiment of the present disclosure.

Referring to FIG. 6, FIG. 6 is a schematic flowchart of another method for detecting and positioning an inspection target according to an embodiment of the present disclosure. As shown in FIG. 6, the method includes the following steps.

S301: Use an ith inspection device in a plurality of inspection devices as a target inspection device in a target inspection process.

S302: Obtain a target inspection sub-region of the target inspection device.

S303: Detect a first inspection target in the target inspection sub-region and a first geographical position of the first inspection target.

S304: Delete a second inspection target and a geographical position of the second inspection target in an inspection target set.

S305: Add a first inspection target and a first geographical position of the first inspection target to the inspection target set.

S306: Display all inspection targets in the inspection target set at geographical positions corresponding to all the inspection targets in an inspection map.

For a specific implementation of steps S302 to S306, refer to descriptions of steps S201 to S205. Details are not described herein again.

S307: Determine whether i is equal to N.

N is a quantity of the plurality of inspection devices.

In a case that i is equal to N, it indicates that all inspection devices in the plurality of inspection devices have been traversed, and a next round of traversal may be performed, then step S308 is performed; and in a case that i is less than N, it indicates that not all the inspection devices in the plurality of inspection devices have been traversed, and i is added by 1 to return to step S301.

S308: Set i to 1, and return to step S301.

After i is set to 1, step S301 may be performed when a timing period expires, and the timing period may be set to, for example, 1 second.

In a technical solution corresponding to FIG. 6, by periodically performing region detection and target detection on each inspection device in the plurality of inspection devices one by one, global statistics of the inspection region can be realized.

In the following, N is 4, that is, a process in which 4 inspection devices perform tasks together in the inspection regions is used to describe the solution of FIG. 6. If the 4 inspection devices are respectively an inspection device x1, an inspection device x2, an inspection device x3, and an inspection device x4. The inspection process may include the following steps.

(1) Obtain an inspection sub-region q1 of the inspection device x1, and detect an inspection target d11 in the inspection sub-region q1 and a geographical position 111 of the inspection target d11, where the inspection sub-region q1 of the inspection device x1 may be obtained through the method introduced in step S201, and detect the inspection target d11 in the inspection sub-region q1 and the geographical position 111 in the inspection sub-region q1 according to the method introduced in step S202.

(2) Delete, in an inspection target set Q, an inspection target d12 located in the inspection sub-region q1 and a geographical position 112 of the inspection target d12, where it may be determined whether the inspection target d12 exists in the inspection target set through the method introduced in steps C1 and C2.

(3) Add the inspection target d11 and the geographical position 111 of the inspection target d11 to the inspection target set Q.

(4) Obtain an inspection sub-region q2 of the inspection device x2, and detect an inspection target d21 in the inspection sub-region q2 and a geographical position 121 of the inspection target d21, where the inspection sub-region q2 of the inspection device x2 may be obtained through the method introduced in step S201, and detect the inspection target d21 in the inspection sub-region q2 and the geographical position 121 of the inspection target d21 according to the method introduced in step S202.

(5) Delete, in the inspection target set Q, an inspection target d22 located in the inspection sub-region q2 and a geographical position 122 of the inspection target d22, where it may be determined whether the inspection target d22 exists in the inspection target set through the method introduced in steps C1 and C2.

(6) Add the inspection target d21 and the geographical position 121 of the inspection target d21 to the inspection target set Q.

(7) Obtain an inspection sub-region q3 of the inspection device x3, and detect an inspection target d31 in the inspection sub-region q3 and a geographical position 131 of the inspection target d31, where the inspection sub-region q3 of the inspection device x3 may be obtained through the method introduced in step S201, and detect the inspection target d31 in the inspection sub-region q3 and the geographical position 131 of the inspection target d31 according to the method introduced in step S202.

(8) Delete, in the inspection target set Q, an inspection target d32 located in the inspection sub-region q3 and a geographical position 132 of the inspection target d32, where it may be determined whether the inspection target d32 exists in the inspection target set through the method introduced in steps C1 and C2.

(9) Add the inspection target d31 and the geographical position 131 of the inspection target d31 to the inspection target set Q.

(10) Obtain an inspection sub-region q4 of the inspection device x4, and detect an inspection target d41 in the inspection sub-region q4 and a geographical position 141 of the inspection target d41, where the inspection sub-region q4 of the inspection device x4 may be obtained through the method introduced in step S201, and detect the inspection target d41 in the inspection sub-region q4 and the geographical position 141 of the inspection target d41 according to the method introduced in step S202.

(11) Delete, in the inspection target set Q, an inspection target d42 located in the inspection sub-region q4 and a geographical position 142 of the inspection target d42, where it may be determined whether the inspection target d42 exists in the inspection target set through the method introduced in steps C1 and C2.

(12) Add the inspection target d41 and the geographical position 141 of the inspection target d41 to the inspection target set Q.

Through step (1) to step (12), traversal of the inspection device 1 to the inspection device 4 may be completed; and then, step (1) may be performed for a new round of traversal, to complete global statistics of inspection targets in the inspection regions.

Alternatively, in some possible cases, there may be a plurality of inspection target sets, and a quantity of the inspection target sets may be equal to a quantity of inspection devices. One inspection target set is used to store inspection targets and geographical positions of the inspection targets detected by one inspection device in a target inspection process. After a target inspection sub-region of a target inspection device, an inspection target in the target inspection sub-region, and a geographical position of the inspection target are obtained, by referring to steps C1 and C2, it may be determined whether a geographical position of an inspection target in each inspection target set is located in the target inspection sub-region. In a case that a geographical position of an inspection target in a first inspection target set of all inspection target sets is located in the target inspection sub-region, an inspection target located in the target inspection sub-region and a geographical position of the inspection target located in the target inspection sub-region may be deleted in the first inspection target set, and then a newly obtained inspection target in the target inspection sub-region and a geographical position of the inspection target are added to an inspection target set corresponding to the target inspection device. In this way, inspection targets in the inspection target set may not intersect with each other, and the purpose of deduplication is achieved. By using different inspection target sets to save inspection targets and geographical positions of the inspection targets detected by different inspection devices, it is convenient to subsequently determine an inspection sub-region and an inspection target inspected by each inspection device.

In the technical solution, in a process that the plurality of inspection devices perform tasks in the inspection regions, after the target inspection sub-region of the inspection device is obtained, and the inspection target located in the target inspection sub-region and the geographical position of the inspection target are detected, the detected inspection target and the geographical position of the inspection target are added to the inspection target set after the inspection target located in the target inspection sub-region and the geographical position of the inspection target located in the target inspection sub-region that are in the inspection target set are deleted first. This can enable the inspection target located in the target inspection sub-region and the geographical position of the inspection target located in the target inspection sub-region that are in the inspection target set to be unique, and avoid repeated statistics of an inspection target in the inspection target set due to an overlapping region covered by the plurality of inspection devices, thereby contributing to improving accuracy of inspection target statistics.

With reference to the first aspect, in a possible implementation, the target inspection device is an ith inspection device in the plurality of inspection devices, 1≤i≤N, and N is a quantity of the plurality of inspection devices; and after the adding the first inspection target and the first geographical position to the inspection target set, the method further includes: using an (i+1)th inspection device in the plurality of inspection devices as the target inspection device, and performing steps of the obtaining a target inspection sub-region of a target inspection device. By performing inspection region detection and target identification and positioning on each inspection device in the plurality of inspection devices one by one, global statistics of the inspection region can be realized.

With reference to the first aspect, in a possible implementation, the method further includes: in the inspection map, displaying inspection sub-regions respectively inspected by the plurality of inspection devices in different colors. By displaying inspection sub-regions respectively inspected by the plurality of inspection devices in different colors, it is helpful for a user to distinguish inspection routes and regions of the inspection devices.

With reference to the first aspect, in a possible implementation, before the deleting a second inspection target and a geographical position of the second inspection target in an inspection target set, the method further includes: determining whether a second geographical position located in the target inspection sub-region exists in the inspection target set; if the second geographical position exists in the inspection target set, determining that the second inspection target exists in the inspection target set; and if the second geographical position does not exist in the inspection target set, determining that the second inspection target does not exist in the inspection target set. It is simple to detect whether there is an inspection target that is in the inspection sub-region in the inspection target set by detecting whether there is a geographical position that is in the inspection sub-region in the inspection target set.

With reference to the first aspect, in a possible implementation, the obtaining a target inspection sub-region of a target inspection device includes: obtaining a target inspection image of the target inspection device; and determining an inspection map region corresponding to the target inspection image as the target inspection sub-region.

With reference to the first aspect, in a possible implementation, before the determining an inspection map region corresponding to the target inspection image as the target inspection sub-region, the method includes: obtaining vertex image coordinates of the target inspection image, where the vertex image coordinates are coordinates in a pixel coordinate system; converting the vertex image coordinates to obtain inspection position coordinates corresponding to the target inspection image, where the inspection position coordinates are coordinates in a world coordinate system; and in the inspection map, determining a sub-region enclosed by the inspection position coordinates as the inspection map region corresponding to the target inspection image. The inspection sub-region of the inspection device is determined by obtaining images and coordinate conversion, so that the inspection sub-region of the inspection device may be accurately determined.

With reference to the first aspect, in a possible implementation, the detecting a first inspection target in the target inspection sub-region and a first geographical position of the first inspection target includes: performing inspection target identification on a target inspection image to obtain the first inspection target and first image coordinates of the first inspection target in the target inspection image; and converting the first image coordinates to obtain first geographical position coordinates of the first inspection target, where the first geographical position coordinates are coordinates in a world coordinate system. The geographical position of inspection target may be determined accurately through target identification and coordinate conversion.

With reference to the first aspect, in a possible implementation, the performing inspection target identification on a target inspection image to obtain the first inspection target and first image coordinates of the first inspection target in the target inspection image includes: performing inspection target identification on the target inspection image through a target identification model to obtain the first inspection target and the first image coordinates of the first inspection target in the target inspection image.

With reference to the first aspect, in a possible implementation, the converting the first image coordinates to obtain first geographical position coordinates of the first inspection target, where the first geographical position coordinates are coordinates in a world coordinate system includes: obtaining a first device attitude and first device position coordinates of the target inspection device, where the first device attitude is a device attitude of the target inspection device when obtaining the target inspection image, the first device position coordinates are geographical position coordinates of the target inspection device when obtaining the target inspection image, and the first device position coordinates are coordinates in a world coordinate system; determining a target conversion matrix based on the first device attitude and the first device position coordinates, where the target conversion matrix indicates a conversion relationship between a pixel coordinate system of the target inspection device when obtaining the target inspection image and the world coordinate system; and converting the first image coordinates based on the target conversion matrix, to obtain the first geographical position coordinates.

Alternatively, in some possible cases, when an inspection target in the inspection target set is displayed in an inspection map, inspection sub-regions respectively inspected by a plurality of inspection devices may be displayed in different colors in the inspection map. Inspection sub-regions inspected by different inspection devices may be displayed in different colors.

For example, for the four inspection devices in FIG. 5, inspection sub-regions inspected by the four inspection devices may be displayed in four colors respectively.

By displaying inspection sub-regions respectively inspected by the plurality of inspection devices in different colors, it is helpful for a user to distinguish inspection routes and regions of the inspection devices.

The method of the present disclosure is described above, and an apparatus of the present disclosure is described below.

Figure 7:
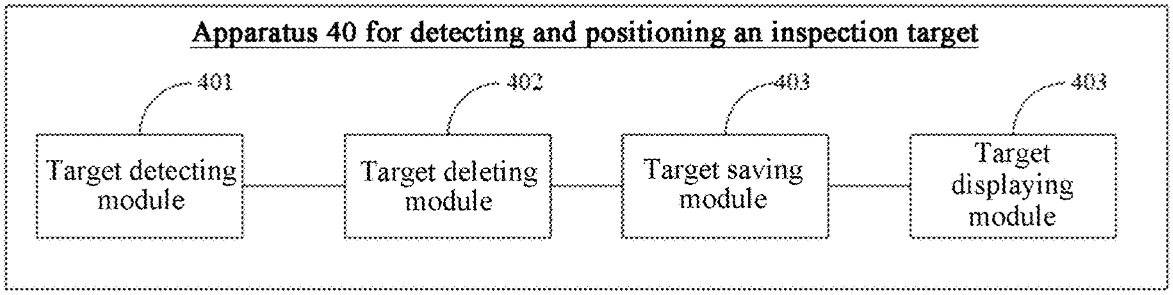
FIG. 7 is a schematic diagram of a structure of an apparatus for detecting and positioning an inspection target according to an embodiment of the present disclosure.

Referring to FIG. 7, FIG. 7 is a schematic diagram of a structure of an apparatus for detecting and positioning an inspection target according to an embodiment of the present disclosure. As shown in FIG. 7, the apparatus 40 for detecting and positioning an inspection target includes:

a target detecting module 401, configured to: obtain a target inspection sub-region of a target inspection device in a target inspection process, and detect a first inspection target in the target inspection sub-region and a first geographical position of the first inspection target, where the target inspection process is a process in which a plurality of inspection devices perform inspection tasks in inspection regions, the target inspection device is any inspection device in the plurality of inspection devices, the target inspection sub-region is a sub-region inspected by the target inspection device, and the target inspection sub-region is one of the inspection regions;

a target deleting module 402, configured to delete a second inspection target and a geographical position of the second inspection target in an inspection target set, where the inspection target set includes all inspection targets detected by the plurality of inspection devices in the target inspection process and geographical positions of all the inspection targets, and the second inspection target is an inspection target that is in the inspection target set and that is located in the target inspection sub-region;

a target saving module 403, configured to add the first inspection target and the first geographical position to the inspection target set; and a target displaying module 404, configured to display all inspection targets in the inspection target set at geographical positions corresponding to all the inspection targets in an inspection map.

In a possible design, the target detection module 401 is further configured to: use an (i+1)th inspection device in the plurality of inspection devices as the target inspection device, and perform steps of the obtaining a target inspection sub-region of a target inspection device.

In a possible design, the target displaying module 404 is further configured to: in the inspection map, display inspection sub-regions respectively inspected by the plurality of inspection devices in different colors.

In a possible design, the target deleting module 402 is further configured to: determine whether a second geographical position located in the target inspection sub-region exists in the inspection target set; if the second geographical position exists in the inspection target set, determine that the second inspection target exists in the inspection target set; and if the second geographical position does not exist in the inspection target set, determine that the second inspection target does not exist in the inspection target set.

In a possible design, the target detecting module 401 is specifically configured to: obtain a target inspection image, where the target inspection image is an inspection image of the target inspection device; and determine an inspection map region corresponding to the target inspection image as the target inspection sub-region.

In a possible design, the target detecting module 401 is specifically configured to: obtain vertex image coordinates of the target inspection image, where the vertex image coordinates are coordinates in a pixel coordinate system; convert the vertex image coordinates to obtain inspection position coordinates corresponding to the target inspection image, where the inspection position coordinates are coordinates in a world coordinate system; and in the inspection map, determine a sub-region enclosed by the inspection position coordinates as the inspection map region corresponding to the target inspection image.

In a possible design, the target detecting module 401 is specifically configured to: perform inspection target identification on a target inspection image to obtain the first inspection target and first image coordinates of the first inspection target in the target inspection image, where the target inspection image is an inspection image of the target inspection device; and convert the first image coordinates to obtain first geographical position coordinates of the first inspection target, where the first geographical position coordinates are coordinates in a world coordinate system.

In a possible design, the target detecting module 401 is specifically configured to: perform inspection target identification on the target inspection image through a target identification model to obtain the first inspection target and the first image coordinates of the first inspection target in the target inspection image.

In a possible design, the target detecting module 401 is specifically configured to: obtain a first device attitude and first device position coordinates of the target inspection device, where the first device attitude is a device attitude of the target inspection device when obtaining the target inspection image, the first device position coordinates are geographical position coordinates of the target inspection device when obtaining the target inspection image, and the first device position coordinates are coordinates in a world coordinate system; determine a target conversion matrix based on the first device attitude and the first device position coordinates, where the target conversion matrix indicates a conversion relationship between a pixel coordinate system of the target inspection device when obtaining the target inspection image and the world coordinate system; and convert the first image coordinates based on the target conversion matrix, to obtain the first geographical position coordinates.

It should be noted that for content not mentioned in an embodiment corresponding to FIG. 7, refer to the description of the foregoing method embodiment, and details are not described herein again.

According to the foregoing apparatus, in a process that the plurality of inspection devices perform tasks in the inspection regions, after the target inspection sub-region of the inspection device is obtained, and the inspection target located in the target inspection sub-region and the geographical position of the inspection target are detected, the detected inspection target and the geographical position of the inspection target are added to the inspection target set after the inspection target located in the target inspection sub-region and the geographical position of the inspection target located in the target inspection sub-region that are in the inspection target set are deleted first. This can enable the inspection target located in the target inspection sub-region and the geographical position of the inspection target located in the target inspection sub-region that are in the inspection target set to be unique, and avoid repeated statistics of an inspection target in the inspection target set due to an overlapping region covered by the plurality of inspection devices, thereby contributing to improving accuracy of inspection target statistics.

Figure 8:
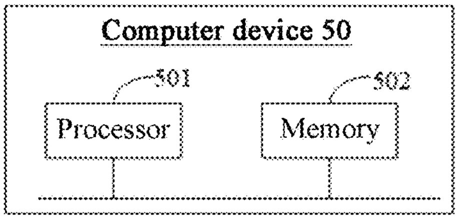
FIG. 8 is a schematic diagram of a structure of a computer device according to an embodiment of the present disclosure.

Referring to FIG. 8, FIG. 8 is a schematic diagram of a structure of a computer device according to an embodiment of the present disclosure, and the computer device 50 includes a processor 501 and a memory 502. The memory 502 is connected to the processor 501, for example, being connected to the processor 501 through a bus.

The processor 501 is configured to support the computer device 50 to perform corresponding functions in the methods in the foregoing method embodiments. The processor 501 may be a central processing unit (central processing unit, CPU), a network processor (network processor, NP), a hardware chip, or a combination thereof. The hardware chip may be an application specific integrated circuit (application specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or a combination thereof.

The memory 502 is configured to store program code and the like. The memory 502 may include a volatile memory (volatile memory, VM), such as a random access memory (random access memory, RAM); the memory 502 may also include a non-volatile memory (non-volatile memory, NVM), such as a read-only memory (read-only memory, ROM), a flash memory (flash memory), a hard disk drive (hard disk drive, HDD), or a solid-state drive (solid-state drive, SSD); and the memory 502 may also include a combination of the above types of memories.

The processor 501 may invoke the program code to perform the following operations:

- obtaining a target inspection sub-region of a target inspection device in a target inspection process, and detecting a first inspection target in the target inspection sub-region and a first geographical position of the first inspection target, where the target inspection process is a process in which a plurality of inspection devices perform inspection tasks in inspection regions, the target inspection device is any inspection device in the plurality of inspection devices, the target inspection sub-region is a sub-region inspected by the target inspection device, and the target inspection sub-region is one of the inspection regions;
- deleting a second inspection target and a geographical position of the second inspection target in an inspection target set, where the inspection target set includes all inspection targets detected by the plurality of inspection devices in the target inspection process and geographical positions of all the inspection targets, and the second inspection target is an inspection target that is in the inspection target set and that is located in the target inspection sub-region;
- adding the first inspection target and the first geographical position to the inspection target set; and
- displaying all inspection targets in the inspection target set at geographical positions corresponding to all the inspection targets in an inspection map.

An embodiment of the present disclosure further provides a computer-readable storage medium, where the computer-readable storage medium stores a computer program, and the computer program includes a program instruction. The program instruction, when being executed by a computer, enables the computer to implement the method according to the foregoing embodiments.

A person of ordinary skill in the art may understand that all or some of the processes in the foregoing method embodiments may be implemented by instructing relevant hardware by the computer program. The program may be stored in a computer readable storage medium. When the program is executed, the processes in the foregoing method embodiments may be included. The storage medium may be: a magnetic disk, an optical disc, a read-only memory (Read-Only memory, ROM), a random access memory (Random Access Memory, RAM), or the like.

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A method for detecting and positioning an inspection target, comprising:

obtaining a target inspection sub-region of a target inspection device in a target inspection process, and spotting a first inspection target in the target inspection sub-region and a first geographical position of the first inspection target using image capture equipment and a positioning module of the target inspection device, wherein the target inspection process is a process in which a plurality of inspection devices perform inspection tasks in inspection regions, the target inspection device is an inspection device in the plurality of inspection devices, the target inspection sub-region is a sub-region inspected by the target inspection device, and the target inspection sub-region is one of the inspection regions, and wherein the positioning module captures a first pose of the target inspection device when the first inspection target is spotted, the first pose comprising attitude information and position information of the target inspection device;

- performing, based on the first pose and the first geographical position, coordinate system conversion on the first geographical position to obtain a first converted coordinate corresponding to the first geographical position;
- determining whether a second geographical position located in the target inspection sub-region exists in the inspection target set;
- in response to determining that the second geographical position exists in the inspection target set, deleting the second inspection target and a geographical position of the second geographical position in an inspection target set, wherein the inspection target set comprises all inspection targets spotted by the plurality of inspection devices in the target inspection process and geographical positions of all the inspection targets, and the second inspection target is an inspection target that is in the inspection target set and that is located in the target inspection sub-region;
- adding the first inspection target and the first geographical converted coordinate position to the inspection target set; and
- displaying all inspection targets in the inspection target set at geographical positions corresponding to all the inspection targets in an inspection map, wherein the detecting a first inspection target in the target inspection sub-region and a first geographical position of the first inspection target comprises:
- performing inspection target identification on a target inspection image to obtain the first inspection target and first image coordinates of the first inspection target in the target inspection image, wherein the target inspection image is an inspection image of the target inspection device; and
- converting the first image coordinates to obtain first geographical position coordinates of the first inspection target, wherein the first geographical position coordinates are coordinates in a world coordinate system, wherein the converting the first image coordinates to obtain first geographical position coordinates of the first inspection target comprises:
- obtaining a first device attitude and first device position coordinates of the target inspection device, wherein the first device attitude is a device attitude of the target inspection device when obtaining the target inspection image, the first device position coordinates are geographical position coordinates of the target inspection device when obtaining the target inspection image, and the first device position coordinates are coordinates in a world coordinate system;
- determining a target conversion matrix based on the first device attitude and the first device position coordinates, wherein the target conversion matrix indicates a conversion relationship between a pixel coordinate system of the target inspection device when obtaining the target inspection image and the world coordinate system; and converting the first image coordinates based on the target conversion matrix, to obtain the first geographical position coordinates.

2. The method for detecting and positioning an inspection target according to claim 1, wherein the target inspection device is an $i^{th}$ inspection device in the plurality of inspection devices, 1≤i≤N, and N is a quantity of the plurality of inspection devices; and after the adding the first inspection target and the first geographical position to the inspection target set, the method further comprises:

using an $(i+1)^{th}$ inspection device in the plurality of inspection devices as the target inspection device, and performing steps of the obtaining a target inspection sub-region of a target inspection device.

3. The method for detecting and positioning an inspection target according to claim 1, wherein the method further comprises:

in the inspection map, displaying inspection sub-regions respectively inspected by the plurality of inspection devices in different colors.

4. The method for detecting and positioning an inspection target according to claim 1, wherein before the deleting a second inspection target and a geographical position of the second inspection target in an inspection target set, the method further comprises:

in response to the second geographical position exists in the inspection target set, determining that the second inspection target exists in the inspection target set; and in response to the second geographical position does not exist in the inspection target set, determining that the second inspection target does not exist in the inspection target set.

5. The method for detecting and positioning an inspection target according to claim 1, wherein the obtaining a target inspection sub-region of a target inspection device comprises:

obtaining a target inspection image, wherein the target inspection image is an inspection image of the target inspection device; and determining an inspection map region corresponding to the target inspection image as the target inspection sub-region.

6. The method for detecting and positioning an inspection target according to claim 5, wherein before the determining an inspection map region corresponding to the target inspection image as the target inspection sub-region, the method comprises:

obtaining vertex image coordinates of the target inspection image, wherein the vertex image coordinates are coordinates in a pixel coordinate system;

converting the vertex image coordinates to obtain inspection position coordinates corresponding to the target inspection image, wherein the inspection position coordinates are coordinates in a world coordinate system; and in the inspection map, determining a sub-region enclosed by the inspection position coordinates as the inspection map region corresponding to the target inspection image.

7. The method for detecting and positioning an inspection target according to claim 1, wherein the performing inspection target identification on a target inspection image to obtain the first inspection target and first image coordinates of the first inspection target in the target inspection image comprises: performing inspection target identification on the target inspection image through a target identification model to obtain the first inspection target and the first image coordinates of the first inspection target in the target inspection image.

8. An apparatus for detecting and positioning an inspection target, comprising:

a target detecting unit, configured to: obtain a target inspection sub-region of a target inspection device in a target inspection process, and spotted a first inspection target in the target inspection sub-region and a first geographical position of the first inspection target, wherein the target inspection process is a process in which a plurality of inspection devices perform inspection tasks in inspection regions, the target inspection device is an inspection device in the plurality of inspection devices, the target inspection sub-region is a sub-region inspected by the target inspection device, and the target inspection sub-region is one of the inspection regions;

a target deleting unit, configured to determine whether a second geographical position located in the target inspection sub-region exists in the inspection target set;

delete a second inspection target and a geographical position of the second inspection target in an inspection target set, wherein the inspection target set comprises all inspection targets spotted by the plurality of inspection devices in the target inspection process and geographical positions of all the inspection targets, and the second inspection target is an inspection target that is in the inspection target set and that is located in the target inspection sub-region;

a target saving unit, configured to add the first inspection target and the first geographical position to the inspection target set; and a target displaying unit, configured to display all inspection targets in the inspection target set at geographical positions corresponding to all the inspection targets in an inspection map, wherein the apparatus is further configured to:

perform inspection target identification on a target inspection image to obtain the first inspection target and first image coordinates of the first inspection target in the target inspection image, wherein the target inspection image is an inspection image of the target inspection device; and convert the first image coordinates to obtain first geographical position coordinates of the first inspection target, wherein the first geographical position coordinates are coordinates in a world coordinate system, obtain a first device attitude and first device position coordinates of the target inspection device, wherein the first device attitude is a device attitude of the target inspection device when obtaining the target inspection image, the first device position coordinates are geographical position coordinates of the target inspection device when obtaining the target inspection image, and the first device position coordinates are coordinates in a world coordinate system;

determine a target conversion matrix based on the first device attitude and the first device position coordinates, wherein the target conversion matrix indicates a conversion relationship between a pixel coordinate system of the target inspection device when obtaining the target inspection image and the world coordinate system; and convert the first image coordinates based on the target conversion matrix, to obtain the first geographical position coordinates.

9. The apparatus for detecting and positioning an inspection target according to claim 8, the apparatus is further configured to:

wherein the target inspection device is an $i^{th}$ inspection device in the plurality of inspection devices, 1≤i≤N, and N is a quantity of the plurality of inspection devices; and after the add the first inspection target and the first geographical position to the inspection target set, the method further comprises:

use an $(i+1)^{th}$ inspection device in the plurality of inspection devices as the target inspection device, and perform steps of the obtaining a target inspection sub-region of a target inspection device.

10. The apparatus for detecting and positioning an inspection target according to claim 9, wherein the method further comprises:

in the inspection map, display inspection sub-regions respectively inspected by the plurality of inspection devices in different colors.

11. The apparatus for detecting and positioning an inspection target according to claim 8, wherein the apparatus is further configured to:

in response to the second geographical position exists in the inspection target set, determine that the second inspection target exists in the inspection target set; and in response to the second geographical position does not exist in the inspection target set, determine that the second inspection target does not exist in the inspection target set.

12. The apparatus for detecting and positioning an inspection target according to claim 8, wherein the apparatus is further configured to:

obtain a target inspection image, wherein the target inspection image is an inspection image of the target inspection device; and determine an inspection map region corresponding to the target inspection image as the target inspection sub-region.

13. The apparatus for detecting and positioning an inspection target according to claim 12, wherein the apparatus is further configured to:

obtain vertex image coordinates of the target inspection image, wherein the vertex image coordinates are coordinates in a pixel coordinate system;

convert the vertex image coordinates to obtain inspection position coordinates corresponding to the target inspection image, wherein the inspection position coordinates are coordinates in a world coordinate system; and in the inspection map, determine a sub-region enclosed by the inspection position coordinates as the inspection map region corresponding to the target inspection image.

14. The apparatus for detecting and positioning an inspection target according to claim 8, wherein the apparatus is further configured to: perform inspection target identification on the target inspection image through a target identification model to obtain the first inspection target and the first image coordinates of the first inspection target in the target inspection image.

15. A non-transitory computer-readable storage medium, wherein the computer-readable storage medium stores a computer program, the computer program comprises a program instruction, and the program instruction, when being executed by a processor, enables the processor to implement a method for detecting and positioning an inspection target; wherein the method comprising:

obtaining a target inspection sub-region of a target inspection device in a target inspection process, and spotting a first inspection target in the target inspection sub-region and a first geographical position of the first inspection target, wherein the target inspection process is a process in which a plurality of inspection devices perform inspection tasks in inspection regions, the target inspection device is an inspection device in the plurality of inspection devices, the target inspection sub-region is a sub-region inspected by the target inspection device, and the target inspection sub-region is one of the inspection regions;

determining whether a second geographical position located in the target inspection sub-region exists in the inspection target set;

deleting a second inspection target and a geographical position of the second inspection target in an inspection target set, wherein the inspection target set comprises all inspection targets spotted by the plurality of inspection devices in the target inspection process and geographical positions of all the inspection targets, and the second inspection target is an inspection target that is in the inspection target set and that is located in the target inspection sub-region;

adding the first inspection target and the first geographical position to the inspection target set; and displaying all inspection targets in the inspection target set at geographical positions corresponding to all the inspection targets in an inspection map, wherein the detecting a first inspection target in the target inspection sub-region and a first geographical position of the first inspection target comprises:

performing inspection target identification on a target inspection image to obtain the first inspection target and first image coordinates of the first inspection target in the target inspection image, wherein the target inspection image is an inspection image of the target inspection device; and converting the first image coordinates to obtain first geographical position coordinates of the first inspection target, wherein the first geographical position coordinates are coordinates in a world coordinate system, wherein the converting the first image coordinates to obtain first geographical position coordinates of the first inspection target comprises:

obtaining a first device attitude and first device position coordinates of the target inspection device, wherein the first device attitude is a device attitude of the target inspection device when obtaining the target inspection image, the first device position coordinates are geographical position coordinates of the target inspection device when obtaining the target inspection image, and the first device position coordinates are coordinates in a world coordinate system;

determining a target conversion matrix based on the first device attitude and the first device position coordinates, wherein the target conversion matrix indicates a conversion relationship between a pixel coordinate system of the target inspection device when obtaining the target inspection image and the world coordinate system; and converting the first image coordinates based on the target conversion matrix, to obtain the first geographical position coordinates.

* * * * *